United States Patent
Qiu et al.

(10) Patent No.: US 11,952,278 B2
(45) Date of Patent: Apr. 9, 2024

(54) LIGNIN POROUS CARBON NANOSHEET, PREPARATION METHOD THEREFOR, AND APPLICATION THEREOF IN SUPERCAPACITOR ELECTRODE MATERIALS

(71) Applicant: South China University of Technology, Guangzhou (CN)

(72) Inventors: Xueqing Qiu, Guangzhou (CN); Dongjie Yang, Guangzhou (CN); Huan Wang, Guangzhou (CN); Zhiqiang Fang, Guangzhou (CN); Hongming Lou, Guangzhou (CN); Weifeng Liu, Guangzhou (CN); Zhixian Li, Guangzhou (CN); Jinhao Huang, Guangzhou (CN); Xinping Ouyang, Guangzhou (CN)

(73) Assignee: South China University of Technology, Guangzhou (CN)

( * ) Notice: Subject to any disclaimer, the term of this patent is extended or adjusted under 35 U.S.C. 154(b) by 496 days.

(21) Appl. No.: 17/261,693

(22) PCT Filed: Oct. 23, 2019

(86) PCT No.: PCT/CN2019/112879
§ 371 (c)(1),
(2) Date: Jan. 20, 2021

(87) PCT Pub. No.: WO2020/103635
PCT Pub. Date: May 28, 2020

(65) Prior Publication Data
US 2021/0323825 A1      Oct. 21, 2021

(30) Foreign Application Priority Data
Nov. 19, 2018   (CN) .......................... 201811375772.8

(51) Int. Cl.
  *C01B 32/15*  (2017.01)
  *H01G 11/24*  (2013.01)
  *H01G 11/36*  (2013.01)

(52) U.S. Cl.
  CPC ............. *C01B 32/15* (2017.08); *H01G 11/24* (2013.01); *H01G 11/36* (2013.01);
  (Continued)

(58) Field of Classification Search
  CPC ........ C01B 32/15; H01G 11/24; H01G 11/36; H01G 11/44; H01G 11/86; H01G 11/34;
  (Continued)

(56) References Cited

U.S. PATENT DOCUMENTS

| 10,195,599 B2 | 2/2019 | Biradar et al. |
| 2016/0355402 A1 | 12/2016 | Mitra |

(Continued)

FOREIGN PATENT DOCUMENTS

| CN | 102633525 A | 8/2012 |
| CN | 103332677 A | 10/2013 |

(Continued)

OTHER PUBLICATIONS

Wang, et al., One-pot in-situ preparation of a lignin-based carbon/ZnO nanocomposite with excellent photocatalytic performace, Materials Chemistry and Physics 2017; 199: 193-202 (Year: 2017).*

(Continued)

*Primary Examiner* — Daniel C. McCracken
(74) *Attorney, Agent, or Firm* — The Webb Law Firm

(57) ABSTRACT

The present invention belongs to the technical field of biomass carbon materials, and relates to a lignin porous carbon nanosheet, a preparation method therefor, and an application thereof in supercapacitor electrode materials. The method of the present invention performs layer-by-layer self-assembly of sulfonated lignin and oxalate in a selective (Continued)

solvent to prepare a layer-by-layer self-assembled lignin/oxalate composite, which is then carbonized and pickled to obtain the lignin porous carbon nanosheets. The lignin porous carbon nanosheets prepared by the above method of the present invention have a specific surface area of 200-1500 m$^2$/g, a micropore specific surface area of 100-500 m$^2$/g, a mesoporous specific surface area of 100-1000 m$^2$/g, a pore diameter of 0.5-30 nm, and a pore volume of 0.5-1.5 cm$^3$/g; they can be applied to supercapacitor electrode materials, showing higher specific capacitance and excellent rate performance (with a specific capacitance retention rate of 76.6%), having good potential application value.

4 Claims, 4 Drawing Sheets

(52) U.S. Cl.
CPC ...... *C01P 2004/03* (2013.01); *C01P 2004/04* (2013.01); *C01P 2006/40* (2013.01)

(58) Field of Classification Search
CPC .............. C01P 2004/03; C01P 2004/04; C01P 2006/40; C01P 2006/12; C01P 2006/14; C01P 2006/16; Y02E 60/13
See application file for complete search history.

(56) References Cited

U.S. PATENT DOCUMENTS

| | | | |
|---|---|---|---|
| 2017/0110259 | A1 | 4/2017 | Mitlin et al. |
| 2019/0291081 | A1 | 9/2019 | Yang et al. |

FOREIGN PATENT DOCUMENTS

| | | | |
|---|---|---|---|
| CN | 105817202 | A | 8/2016 |
| CN | 106024423 | A | 10/2016 |
| CN | 106185920 | A | 12/2016 |
| CN | 106241780 | A | 12/2016 |
| CN | 106517179 | A | 3/2017 |
| CN | 106564876 | A | 4/2017 |
| CN | 106744789 | A | 5/2017 |
| CN | 106744793 | A | 5/2017 |
| CN | 107282030 | A | 10/2017 |
| CN | 108751160 | A | 11/2018 |
| CN | 109485029 | A | 3/2019 |
| WO | 2014207765 | A2 | 12/2014 |

OTHER PUBLICATIONS

Zhang, et al., Interconnected Hierarchical Porous Carbon from Lignin-Derived Byproducts of Bioethanol Production for Ultra-High Performance Supercapacitors, ACS Appl. Mater. Interfaces 2016; 8: 13918-13925 (Year: 2016).*
Al-Lagtah et al., "Chemical and physical characteristics of optimal synthesised activated carbons from grass-derived sulfonated lignin versus commercial activated carbons", Microporous and Mesoporous Materials, 2016, pp. 504-514, vol. 225.
Guo et al., "Enzymatic hydrolysis lignin derived hierarchical porous carbon for supercapacitors in ionic liquids with high power and energy densities", Green Chemistry, 2017, pp. 2595-2602, vol. 19, No. 11.
Huang et al., "Directed 2D nanosheet assemblies of amphiphilic lignin derivatives: Formation of hollow spheres with tunable porous structure", Industrial Crops & Products, 2019, pp. 16-25, vol. 127.
Jeon et al., "Controlling Porosity in Lignin-Derived Nanoporous Carbon for Supercapacitor Applications", ChemSusChem, 2015, pp. 1-6, vol. 8, No. 3.
Liu et al., "Lignin-derived carbon nanosheets for high-capacitance supercapacitors", RSC Adv., 2017, pp. 48537-48543, vol. 7, No. 77.
Pang et al., "Facile and sustainable synthesis of sodium lignosulfonate derived hierarchical porous carbons for supercapacitors with high volumetric energy densities", Green Chemistry, 2017, pp. 1-13, vol. 19, No. 16.
Pang et al., "Sustainable nitrogen-containing hierarchical porous carbon spheres derived from sodium lignosulfonate for high-performance supercapacitors", Carbon, 2018, pp. 280-293, vol. 132.
Wang et al., "Probing the interactions between lignin and inorganic oxides using atomic force microscopy", Applied Surface Science, 2016, pp. 617-622, vol. 390.
Zhang et al., "Preparation and Pore Features of Soda Lignin-based Activated Carbon" Forestry Machinery & Woodworking Equipment, 2017, pp. 1-5, vol. 45, No. 2.
Jinjin, "Preparation of C—ZnO Composite by lignin and the study on its photocatalytic property", Masters Dissertation, Northease Forestry University, 2015, pp. 1-63. (English-language Abstract).
Kaifang "Preparation characterization and application of lignin-based activated carbons from black liquor", Shandong University, 2018, pp. 1-164. (English-language Abstract).
Ming, "Preparation and Characterization of Collagen-Based Nitrogen-Doped Porous Carbon Materials", Dissertation, Beijing University of Chemical Technology, 2016, pp. 1-92. (English-language Abstract).

* cited by examiner

LIGNIN POROUS CARBON NANOSHEET, PREPARATION METHOD THEREFOR, AND APPLICATION THEREOF IN SUPERCAPACITOR ELECTRODE MATERIALS

CROSS-REFERENCE TO RELATED APPLICATIONS

This application is the United States national phase of International Application No. PCT/CN2019/112879 filed Oct. 23, 2019, and claims priority to Chinese Patent Application No. 201811375772.8 filed Nov. 19, 2018, the disclosures of each of which are hereby incorporated by reference in their entireties.

BACKGROUND OF THE INVENTION

Field of the Invention

The present invention belongs to the technical field of biomass carbon materials, and particularly relates to a lignin porous carbon nanosheet, a preparation method therefor, and an application thereof in supercapacitor electrode materials.

Description of Related Art

The massive consumption of traditional fossil energy and the increasingly severe environmental pollution have forced countries around the world to raise the development of green and environmentally friendly new energy to a strategic height. Electrochemical energy storage devices play a very important role in the development of the green sustainable energy storage and conversion technology. As a new energy storage device between traditional physical capacitors and secondary batteries, supercapacitors have attracted extensive attention in portable electronic equipment, electric vehicles and other fields due to their high power density, fast charging and discharging, long cycle life, wide applicable temperature range, and other advantages. Electrode materials of the supercapacitors, as a key factor affecting the performance of the supercapacitors, mainly include carbon materials, metal oxides, and conductive polymers. Among them, carbon materials have been widely studied because of their advantages such as a large specific surface area, adjustable pore structure, superior electroconductivity, and stable chemical properties. Among many carbon materials, graphene has a very large theoretical specific surface area and electroconductivity, and is thus considered to be the most potential electrode material for supercapacitors; however, graphene is not easy to prepare on a large scale, which greatly limits its industrial application. Therefore, there is an urgent need to develop a porous carbon material with a large specific surface area and easy to be prepared on a large scale for the research of supercapacitor electrode materials.

Lignin is the second most abundant organic polymer in natural plants, and it is also the only renewable aromatic polymer, having an annual output as high as 150 billion tons worldwide. Lignin is a high molecular polymer with phenylpropane monomers to constitute the hydrophobic skeleton. Industrial lignin mainly includes lignosulfonate with good water solubility from the acid pulping waste liquor, alkali lignin from the alkali pulp and paper industry, and enzymolytic lignin from the biorefinery industry. Lignin is an ideal precursor of carbon materials because of its wide source, low cost, and high carbon content as high as 60%.

Lignosulfonate has good water solubility, and can be directly carbonized at a high temperature to prepare porous carbon. For example, Chinese Patent CN 102633525 used lignosulfonate derived from the acid pulping waste liquor as a carbon source to directly prepare porous carbon materials by high-temperature carbonization in an inert atmosphere. Pang et al. prepared lignin porous carbon through one-step high-temperature pyrolysis of sodium lignosulfonate (*Green Chemistry*, 2017, 19(16): 3916-3926); in addition, they also directly carbonized sodium lignosulfonate through pre-oxidation to prepare lignin porous carbon spheres (*Carbon*, 2018, 132: 280-293); however, since no activator or template was added in the preparation process, the prepared porous carbon material had a small specific surface area and insufficient pore structure, thus having a low specific capacitance. The carbon material prepared by direct carbonization of alkali lignin had a smaller specific surface area and a specific capacitance less than 50 F/g, which could not meet the requirements of supercapacitors for electrode materials (*ChemSusChem*, 2015, 8(3): 428-432).

In order to increase the specific surface area and adjust the pore structure, chemical activation and template methods are often used in the preparation of lignin porous carbon. The chemical activation method mainly uses the etching effect of strong corrosive reagents (KOH, $ZnCl_2$, etc.) at a high temperature to obtain porous carbon dominated by micropore distribution. For example, Chinese patent CN 1061855920A disclosed a lignin porous carbon material, a preparation method therefor, and an application thereof; this method used the alkali lignin in the alkaline papermaking black liquor containing KOH as the carbon precursor, and obtained a porous carbon material with a large specific surface area through pretreatment, carbonization, and activation; however, the obtained lignin porous carbon was an aggregate with serious agglomeration, and its preparation process included secondary activation and consumed a lot of energy, not conducive to industrial production. Zhang Guanzhong used alkali lignin as the carbon precursor, mixed it with a $ZnCl_2$ solution and then dried it, and then performed high-temperature carbonization in an inert gas atmosphere to obtain alkali lignin-based activated carbon dominated by micropore distribution (Forestry Machinery & Woodworking Equipment, 2017, 45(02):35-39); however, the $ZnCl_2$ used in this method was prone to volatilize in large quantities at a high temperature, which would cause corrosion of the production equipment and environmental pollution. A large number of studies have shown that lignin porous carbon with a large specific surface area can be prepared by the chemical activation method; however, the lignin porous carbon still has serious aggregation in its microscopic morphology and contains too many irregular microporous structures, which increases the transmission resistance of the electrolyte solution in its interior and makes improving its electrochemical performance difficult. In addition, the high-temperature carbonization process consumes a lot of energy, causes great damage to the equipment, and has a low product yield. In order to reduce the corrosion of the activator to the equipment, potassium oxalate was used as an activator to prepare the activated carbon material by impregnating lignin extracted from the papermaking black liquor and carbonizing it at a high temperature (Fu Kaifang, *Preparation, Characterization and Adsorption Application of Lignin Activated Carbon from Papermaking Black Liquor*, Shandong University, 2018). Calcium oxalate was used as an activator of protein to prepare a porous carbon material through one-step carbonization (Yan Ming, *Preparation and Characterization of Collagen-Based Nitrogen-Doped Porous*

Carbon Materials, Beijing University of Chemical Technology, 2016). Potassium oxalate and calcium oxalate had weak corrosion to production equipment, but the activation temperature was still high and the activation efficiency was low.

The template method mainly uses the structure-oriented effect of template agents ($SiO_2$, $Al_2O_3$, ZnO, and other oxides) to precisely control the pore diameter of porous carbon materials. For example, Chinese patent CN 106744793A disclosed a porous carbon material for alkali lignin-based supercapacitors, a preparation method therefor, and an application thereof; this method used alkali lignin crudely purified from the papermaking black liquor as a carbon precursor, and prepared a three-dimensional lignin porous carbon material by a double template method. The preparation process of this method was relatively complicated, and the obtained porous carbon material had poor electrochemical performance; when the current density was 1 A/g, the maximum specific capacitance was only 141.4 F/g. Chinese patent CN 106744789 A disclosed a method for preparing porous carbon from lignin and an application of the porous carbon in supercapacitors; this method used the lignin extracted from the black liquor by acid precipitation as the carbon precursor, dissolved the lignin in an ethanol solution, and mixed the obtained solution with a zinc salt for hydrothermal treatment, and then used the produced zinc oxide as a template to carbonize in an inert gas to obtain spherical porous carbon. A method for preparing a lignin carbon/rod-shaped zinc oxide composite material by direct precipitation was reported (Shi Jinjin, *Study on C—ZnO Composite Material Prepared with Lignin and Its Photocatalytic Performance*, Northeast Forestry University, 2015); ethanol was added dropwise to the mixed solution of zinc acetate and sodium lignosulfonate to adjust the pH of the solution to alkaline to generate sodium lignosulfonate/$Zn(OH)_2$ composite precipitation, which was carbonized in an inert gas to obtain the target product to apply to the field of photocatalyst. The template method can be used to prepare porous carbon materials with concentrated pore diameter distribution; however, the pore structure distribution of the prepared porous carbon is relatively single, the preparation process is complicated, and the cost is high.

In order to increase the pore abundance of lignin porous carbon, Liu et al. used water-soluble alkali lignin as the carbon precursor, and subjected it to liquid nitrogen freezing pretreatment and high-temperature carbonization for 6 h to obtain lignin porous carbon nanosheets with a thickness of about 100 nm (*RSC Advances*, 2017, 7(77): 48537-48543). This process took a long time to carbonize, and consumed more energy; besides, the liquid nitrogen freezing pretreatment process had high requirements for equipment and was dangerous, which was not conducive to industrialized large-scale production. Guo et al., using enzymolytic lignin as the carbon precursor, reduced the accumulation of lignin through hydrothermal pretreatment with dilute sulfuric acid, and then activated the lignin by KOH at a high temperature to obtain lignin porous carbon with three-dimensional hierarchical pores (*Green Chemistry*, 2017, 19(11): 2595-2602). The lignin carbon obtained by this method had good electroconductivity; however, the hydrothermal pretreatment process took a long time, and the activator KOH corroded the equipment seriously, which was not conducive to the industrial scale production. Chinese patent CN 105817202 A disclosed a preparation method and use of a three-dimensional lignin-based hierarchical porous activated carbon material; this method firstly used silica microspheres as a template to prepare lignin activated carbon, and then mixed the obtained activated carbon with KOH for secondary activation to prepare the three-dimensional lignin-based hierarchical porous activated carbon material; this method had complicated steps and was difficult to remove the silica template.

In summary, since industrial lignin such as alkali lignin or enzymolytic lignin has poor water solubility and weak dispersibility of solid particles, the lignin porous carbon prepared from the direct carbonization product has serious agglomeration and irregular microscopic pores, etc., and is thus not suitable for supercapacitor electrodes; the existing chemical activation method or template method has problems such as complicated process, serious corrosion to equipment, and high production cost.

SUMMARY OF THE INVENTION

In order to overcome the above shortcomings and deficiencies of the prior art, the primary object of the present invention is to provide a method for preparing lignin porous carbon nanosheets.

The method of the present invention uses oxalate as an activator and water-soluble sulfonated lignin as a carbon precursor and a dispersant to prepare lignin porous carbon nanosheets. This method specifically uses water-soluble sulfonated lignin as a carbon precursor and dispersant, and weakly corrosive oxalate as an activator, makes them self-assembled layer by layer in a selective solvent to prepare a uniformly dispersed composite, and then carbonizes the composite to prepare lignin porous carbon nanosheets with a regular structure.

In the preparation process of the method of the present invention, the sulfonic acid group in the sulfonated lignin is conducive to improving the dispersion of the precursor liquid and the activator; in the layer-by-layer self-assembly process, the lignin and activator molecules are combined at the molecular level, which is beneficial to improve the activated carbonization effect and further increases the porosity and structural regularity of the carbonized products; and the carbonized products are applied to the supercapacitor electrode materials to improve the specific capacitance and rate performance of supercapacitors.

Another object of the present invention is to provide the lignin porous carbon nanosheets prepared by the above method.

Still another object of the present invention is to provide the application of the above lignin porous carbon nanosheets in supercapacitor electrode materials.

The objects of the present invention are achieved through the following technical solution:

The present invention provides a method for preparing lignin porous carbon nanosheets; this method performs layer-by-layer self-assembly of the sulfonated lignin and oxalate in a selective solvent to prepare a layer-by-layer self-assembled lignin/oxalate composite, which is then carbonized and pickled to obtain the lignin porous carbon nanosheets.

The weight ratio of the sulfonated lignin to the oxalate is preferably 100:(50-150).

The selective solvent is a water/ethanol combined solvent.

Performing "layer-by-layer self-assembly" means that the dispersive liquid obtained by dispersing the sulfonated lignin and oxalate in water is used as the matrix solution, and the lignin/oxalate composite is assembled multiple times, thus obtaining the layer-by-layer self-assembled lignin/oxalate composite.

The lignin/oxalate composite is obtained by adding ethanol to the matrix solution for precipitation and separation.

Being "assembled" means the lignin/oxalate composite is added to the matrix solution and stirred uniformly, and then ethanol is added thereto for precipitation and separation to obtain the assembled lignin/oxalate composite.

Being "assembled multiple times" means repeating the above assembly steps many times; specifically, the assembled lignin/oxalate composite is added to the matrix solution and stirred uniformly, and then ethanol is added thereto for precipitation and separation to obtain the lignin/oxalate composite after the secondary assembly, with the process repeated several times, preferably 6-10 times, more preferably 6 times.

The total mass concentration of the sulfonated lignin and oxalate in the matrix solution is preferably 2% to 10%.

In the method of the present invention, the volume ratio of the matrix solution to ethanol taken each time is preferably 1:1.

In the method of the present invention, being "stirred uniformly" is preferably carried out for 10-30 min.

In the method of the present invention, being "carbonized" means carbonizing at 550° C. to 850° C. for 2-4 h to obtain the lignin porous carbon nanosheets.

The carbonization is preferably carried out in an inert atmosphere.

Being "pickled" means that the carbonized product is washed in an acid solution of 0.5-2 mol/L for 1-3 h, and then washed with water, filtered and dried.

The acid solution can be hydrochloric acid or sulfuric acid.

Being "dried" may be realized by blast drying, vacuum drying, freeze drying, infrared drying, etc., preferably freeze drying.

In the method of the present invention, the sulfonated lignin can be at least one of the following substances: sodium lignosulfonate, calcium lignosulfonate and magnesium lignosulfonate in the acid pulping red liquor; sulfonated products of alkali lignin in the alkali pulping black liquor; and sulfonated products of enzymolytic lignin in the biorefinery industry.

The oxalate is preferably at least one of zinc oxalate, calcium oxalate, magnesium oxalate, ferrous oxalate, and cobalt oxalate.

The preparation method of the present invention comprises the following steps:
(1) dispersing sulfonated lignin and oxalate in water to obtain a matrix solution;
(2) taking A volume fraction of the matrix solution, adding B volume fraction of ethanol thereto while stirring, and separating the precipitate after standing to obtain a lignin/oxalate composite;
(3) likewise taking A volume fraction of the matrix solution, adding the lignin/oxalate composite obtained in step (2) thereto and stirring uniformly, then likewise adding B volume fraction of ethanol, and separating the precipitate after standing to obtain the assembled lignin/oxalate composite;
(4) repeating step (3) several times to obtain the layer-by-layer self-assembled lignin/oxalate composite; and
(5) placing the layer-by-layer self-assembled lignin/oxalate composite in an inert atmosphere, carbonizing it at 550° C. to 850° C. for 2-4 h, and then pickling it to obtain the lignin porous carbon nanosheets.

The preparation method of the present invention will be described in more detail below:

(1) Weighing a certain amount of sulfonated lignin and oxalate solid powder, and formulating them into a dispersive liquid with a certain mass concentration as a matrix solution;

in this step, the oxalate solid powder is dispersed by the sulfonic acid group of the sulfonated lignin to prepare a uniformly dispersed dispersive liquid; the dispersive liquid of the sulfonated lignin and oxalate is preferably formulated with a mass concentration of 2% to 10%; if the mass concentration of the dispersive liquid is lower than 2%, the yield of the subsequent lignin/oxalate composite will be lower; if the mass concentration of the dispersive liquid is greater than 10%, the lignin and oxalate are likely to agglomerate themselves;

in this step, the weight ratio of sulfonated lignin to oxalate is 100:(50-150); if the weight ratio of oxalate is less than 50, the carbonization effect of the subsequent products will be poor, and the prepared lignin porous carbon nanosheets will have less pore structure; if the weight ratio of oxalate is greater than 150, the dispersion effect of sulfonated lignin will be affected.

(2) Taking a certain volume of the above dispersive liquid, adding a certain volume of ethanol thereto, and separating the precipitate after standing to obtain a lignin/oxalate composite;

in this step, sulfonated lignin, which has good water solubility but is insoluble in ethanol, is self-assembled in the selective solvent ethanol-water, and a uniform lignin/oxalate composite is prepared through the interaction between the metal cations of oxalate and the 7l bonds of the lignin molecules; this step is the key to the efficient and uniform combination of oxalate and lignin.

(3) Taking a certain volume of the dispersive liquid prepared in step (1), adding the lignin/oxalate composite prepared in step (2) thereto and stirring uniformly, adding a certain volume of ethanol, and separating the precipitate after standing to obtain the assembled lignin/oxalate composite;

in this step, the volumes of the taken dispersive liquid and the added ethanol are the same as those in step (2), and the lignin/oxalate composite needs to be stirred after being added; if the lignin/oxalate composite is not stirred uniformly, it will be difficult to form a uniform lignin/oxalate composite in the subsequent layer-by-layer self-assembly process.

(4) Repeating step (3) N times, and separating the precipitate to obtain the layer-by-layer self-assembled lignin/oxalate composite;

in this step, step (3) is repeated N times, preferably 6-10 times, more preferably 6 times; if the number of self-assembly is less than 6, the layer-by-layer self-assembled lignin/oxalate composite will have a lower yield after carbonization; if the number of self-assembly is greater than 10, the preparation process will take a long time, affecting the production efficiency.

(5) Placing the lignin/oxalate composite prepared in step (4) in an inert atmosphere, carbonizing it at 550° C. to 850° C. for 2-4 h, and then pickling it to obtain the lignin porous carbon nanosheets;

in this step, the inert atmosphere can be nitrogen or argon or other inert gases; it is required that the carbonization temperature is 550° C. to 850° C., and the carbonization time is 2-4 h; if the carbonization temperature or time is insufficient, the carbonization effect of lignin will be poor; too high the carbonization temperature or too long the carbonization time will cause excessive carbonization, resulting in a low product yield and high energy consumption.

The lignin porous carbon nanosheets prepared by the above method of the present invention have a specific surface area of 200-1500 m$^2$/g, a micropore specific surface area of 100-500 m$^2$/g, a mesoporous specific surface area of 100-1000 m$^2$/g, a pore diameter of 0.5-30 nm, and a pore volume of 0.5-1.5 cm$^3$/g, applicable in supercapacitor electrode materials.

Based on the fact that sulfonated lignin has good water solubility in an aqueous solution but is insoluble in organic solvents, and has good dispersibility for oxalate, the method of the present invention utilizes the interaction force between the metal cations in the oxalate and the n bonds of the lignin molecules in a selective solvent to prepare a uniform lignin/oxalate composite through a layer-by-layer self-assembly process. Subsequently, the composite is carbonized, and pickled to remove the metal oxide nanoparticles between the lignin carbon layers to obtain the lignin porous carbon nanosheets with coexisting micropores and mesopores. In the carbonization process, oxalate has a dual role of activation and template. Firstly, the gas generated during the thermal decomposition of oxalate can activate lignin to form pores to facilitate the formation of a microporous structure, and also has a peeling effect to prevent condensation polymerization of lignin during carbonization; secondly, the metal oxide nanoparticles generated by the thermal decomposition of oxalate can be used as a template to etch and support the lignin carbon sheet framework, which is beneficial to the formation of a carbon nanosheet structure containing abundant mesopores. This porous carbon nanosheet structure not only significantly increases the adsorption active sites of electrolyte ions on the lignin carbon, but also provides a channel for the rapid transmission and diffusion of electrolyte ions in the transversal and longitudinal directions of the sheet, greatly improving the specific capacitance and rate performance of the supercapacitor electrode materials.

Compared with the prior art, the present invention has the following advantages and beneficial effects:

(1) Compared with the lignin porous carbon prepared by the traditional chemical activation method and template method, the lignin porous carbon nanosheet prepared by the present invention has a reasonable pore structure, an abundant pore diameter distribution and a more regular two-dimensional carbon nanosheet structure. The lignin porous carbon nanosheet prepared by the present invention, when applied to the supercapacitor electrode materials, can provide a good channel for the rapid diffusion and transmission of electrolyte ions in the electrochemical process, showing higher specific capacitance and excellent rate performance, having good potential application value.

(2) In the preparation process of the lignin porous carbon nanosheets, the present invention, using water-soluble sulfonated lignin as a carbon precursor and dispersant and weakly corrosive oxalate as an activator, has a wide range of cheap and easily available raw materials, a simple and environmentally friendly preparation process, low corrosion to equipment, and easy realization of large-scale preparation, and realizes the high value-added utilization of lignin, which is beneficial to environmental protection.

DETAILED DESCRIPTION

Figure 1:
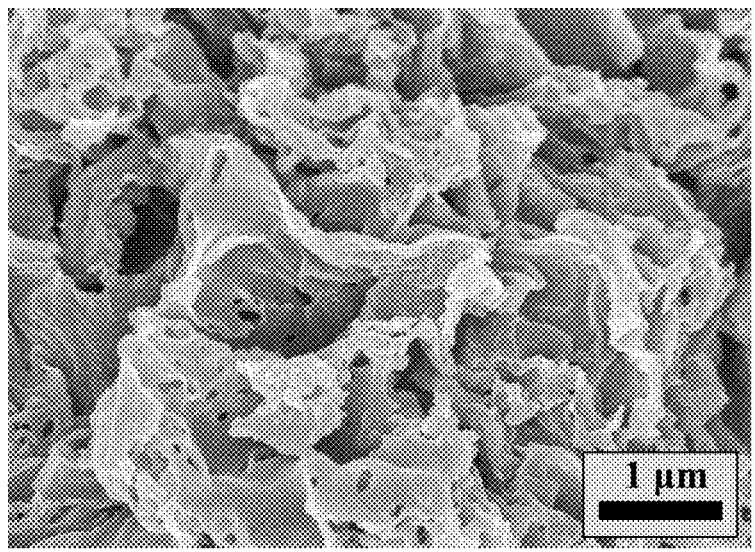
FIG. 1 shows a scanning electron micrograph of the lignin porous carbon nanosheets prepared in Example 1 of the present invention.

The present invention will be further described in detail with reference to examples, but the embodiments of the present invention are not limited thereto.

The materials involved in the following examples are commercially available. The dosage of each component is provided in parts by mass or volume.

Example 1

Weighing 5 parts by mass of sodium lignosulfonate and 5 parts by mass of zinc oxalate solid powder to dissolve in 500 parts by volume of water, and stirring uniformly to obtain a stable dispersive liquid A; taking 50 parts by volume of the dispersive liquid A, adding 50 parts by volume of ethanol thereto while stirring, and separating the precipitate after standing to obtain a lignin/zinc oxalate composite; then taking 50 parts by volume of the dispersive liquid A, adding the prepared lignin/zinc oxalate composite thereto and stirring for 20 min, adding 50 parts by volume of ethanol, and separating the lignin/zinc oxalate composite after standing; repeating the above steps 6 times, and separating the precipitate to obtain the layer-by-layer self-assembled lignin/zinc oxalate composite.

Placing the layer-by-layer self-assembled lignin/zinc oxalate composite in an inert atmosphere, and carbonizing at 750° C. for 3 h to obtain the lignin carbon/zinc oxide composite; immersing the product in 1 mol/L hydrochloric acid to wash for 2 h, then washing with water, filtering and freeze-drying to obtain the lignin porous carbon nanosheets.

Example 2

Weighing 10 parts by mass of magnesium lignosulfonate and 5 parts by mass of magnesium oxalate solid powder to dissolve in 500 parts by volume of water, and stirring uniformly to obtain a stable dispersive liquid A; taking 50 parts by volume of the dispersive liquid A, adding 50 parts by volume of ethanol thereto while stirring, and separating the precipitate after standing to obtain a lignin/magnesium oxalate composite; then taking 50 parts by volume of the dispersive liquid A, adding the prepared lignin/magnesium oxalate composite thereto and stirring for 20 min, adding 50 parts by volume of ethanol, and separating the lignin/magnesium oxalate composite after standing; repeating the above steps 8 times, and separating the precipitate to obtain the layer-by-layer self-assembled lignin/magnesium oxalate composite.

Placing the layer-by-layer self-assembled lignin/magnesium oxalate composite in an inert atmosphere, and carbonizing at 550° C. for 4 h to obtain the lignin carbon/magnesium oxide composite; immersing the product in 0.5 mol/L hydrochloric acid to wash for 3 h, then washing with water, filtering and freeze-drying to obtain the lignin porous carbon nanosheets.

Example 3

Weighing 5 parts by mass of calcium lignosulfonate and 7.5 parts by mass of calcium oxalate solid powder to dissolve in 500 parts by volume of water, and stirring uniformly to obtain a stable dispersive liquid A; taking 50 parts by volume of the dispersive liquid A, adding 50 parts by volume of ethanol thereto while stirring, and separating the precipitate after standing to obtain a lignin/calcium oxalate composite; then taking 50 parts by volume of the dispersive liquid A, adding the prepared lignin/calcium oxalate composite thereto and stirring for 20 min, adding 50 parts by volume of ethanol, and separating the lignin/calcium oxalate composite after standing; repeating the above steps 6 times, and separating the precipitate to obtain the layer-by-layer self-assembled lignin/calcium oxalate composite.

Placing the layer-by-layer self-assembled lignin/calcium oxalate composite in an inert atmosphere, and carbonizing at 650° C. for 3 h to obtain the lignin carbon/calcium oxide composite; immersing the product in 2 mol/L hydrochloric acid to wash for 2 h, then washing with water, filtering and freeze-drying to obtain the lignin porous carbon nanosheets.

Example 4

Weighing 5 parts by mass of sulfonated alkali lignin and 5 parts by mass of zinc oxalate solid powder to dissolve in 500 parts by volume of water, and stirring uniformly to obtain a stable dispersive liquid A; taking 50 parts by volume of the dispersive liquid A, adding 50 parts by volume of ethanol thereto while stirring, and separating the precipitate after standing to obtain a lignin/zinc oxalate composite; then taking 50 parts by volume of the dispersive liquid A, adding the prepared lignin/zinc oxalate composite thereto and stirring for 20 min, adding 50 parts by volume of ethanol, and separating the lignin/zinc oxalate composite after standing; repeating the above steps 6 times, and separating the precipitate to obtain the layer-by-layer self-assembled lignin/zinc oxalate composite.

Placing the layer-by-layer self-assembled lignin/zinc oxalate composite in an inert atmosphere, and carbonizing at 850° C. for 2 h to obtain the lignin carbon/zinc oxide composite; immersing the product in 2 mol/L hydrochloric acid to wash for 2 h, then washing with water, filtering and freeze-drying to obtain the lignin porous carbon nanosheets.

Example 5

Weighing 10 parts by mass of sulfonated enzymolytic lignin and 10 parts by mass of cobalt oxalate solid powder to dissolve in 1000 parts by volume of water, and stirring uniformly to obtain a stable dispersive liquid A; taking 100 parts by volume of the dispersive liquid A, adding 100 parts by volume of ethanol thereto while stirring, and separating the precipitate after standing to obtain a lignin/cobalt oxalate composite; then taking 100 parts by volume of the dispersive liquid A, adding the prepared lignin/cobalt oxalate composite thereto and stirring for 20 min, adding 100 parts by volume of ethanol, and separating the lignin/cobalt oxalate composite after standing; repeating the above steps 8 times, and separating the precipitate to obtain the layer-by-layer self-assembled lignin/cobalt oxalate composite.

Placing the layer-by-layer self-assembled lignin/cobalt oxalate composite in an inert atmosphere, and carbonizing at 750° C. for 2 h to obtain the lignin carbon/cobalt oxide composite; immersing the product in 1 mol/L hydrochloric acid to wash for 2 h, then washing with water, filtering and freeze-drying to obtain the lignin porous carbon nanosheets.

Example 6

Weighing 10 parts by mass of calcium lignosulfonate and 10 parts by mass of zinc oxalate solid powder to dissolve in 500 parts by volume of water, and stirring uniformly to obtain a stable dispersive liquid A; taking 50 parts by volume of the dispersive liquid A, adding 50 parts by volume of ethanol thereto while stirring, and separating the precipitate after standing to obtain a lignin/zinc oxalate composite; then taking 50 parts by volume of the dispersive liquid A, adding the prepared lignin/zinc oxalate composite thereto and stirring for 20 min, adding 50 parts by volume of ethanol, and separating the lignin/zinc oxalate composite after standing; repeating the above steps 7 times, and separating the precipitate to obtain the layer-by-layer self-assembled lignin/zinc oxalate composite.

Placing the layer-by-layer self-assembled lignin/zinc oxalate composite in an inert atmosphere, and carbonizing at 650° C. for 2 h to obtain the lignin carbon/zinc oxide composite; immersing the product in 1 mol/L hydrochloric acid to wash for 2 h, then washing with water, filtering and freeze-drying to obtain the lignin porous carbon nanosheets.

The prepared lignin porous carbon nanosheets were applied to supercapacitor electrode materials and subjected to material characterization and electrochemical testing. The results are shown in Table 1 and FIGS. 1 to 5.

The microscopic morphology and structure of the samples were characterized by scanning electron microscope (SEM, Hitachi S-550) and high resolution field emission transmission electron microscope (HRTEM, JEOL JEM-2100F, 200 kV). The specific surface area and pore structure of the samples were tested using a fully automatic specific surface and porosity analyzer (Micromeritics ASAP 2020 instrument).

The electrochemical test was carried out on an electrochemical workstation (CHI660E, Shanghai Chenhua) in a three-electrode system. The preparation process of the working electrode was as follows: The prepared lignin porous carbon nanosheets, acetylene black and polytetrafluoroethylene emulsion (having a solid content of 60 wt %) were dispersed in absolute ethanol at a mass ratio of 8:1:1, fully ground, and coated onto a piece of foam nickel of 1 cm×1 cm after the ethanol was completely volatilized; and then the foam nickel was pressed to obtain the working electrode. A platinum electrode was used as the counter electrode, and a saturated calomel electrode as the reference electrode. The cyclic voltammetry curve was obtained at a scanning speed of 10-200 mV/s in the voltage window of −1 V to 0 V. The constant DC charge and discharge curves were obtained at a current density of 1.0-20.0 A/g in the voltage window of −1 V to 0 V.

In Table 1, the lignin porous carbon nanosheets prepared in the above examples were compared in terms of electrochemical performance with the lignin carbon-1 prepared by KOH activation and the lignin carbon-2 prepared by $ZnCl_2$ activation.

The preparation steps of the lignin carbon-1 in Table 1: Weighing 5 parts by mass of sodium lignosulfonate and 10 parts by mass of KOH, dissolving them in 100 parts by volume of water, and heating to keep at 80° C. and stirring until the water was evaporated completely; grinding the obtained solid thoroughly, then carbonizing it in an inert atmosphere at 800° C. for 2 h, then soaking the product in 1 mol/L hydrochloric acid for 2 h, and then washing with water, filtering and freeze-drying to obtain the lignin carbon-1. The preparation steps of the lignin carbon-2: Weighing 5 parts by mass of sodium lignosulfonate and 10 parts by mass of $ZnCl_2$, dissolving them in 100 parts by volume of water, and heating to keep at 80° C. and stirring until the water was evaporated completely; grinding the obtained solid thoroughly, then carbonizing it in an inert atmosphere at 700° C. for 2 h, then soaking the product in 1 mol/L hydrochloric acid for 2 h, and then washing with water, filtering and freeze-drying to obtain the lignin carbon-2.

TABLE 1

Electrochemical performance of lignin porous carbon nanosheets

| Electrode material | Specific capacitance (F/g) at different current densities (A/g) | | | | | Specific capacitance retention rate (%) |
|---|---|---|---|---|---|---|
| | 1.0 | 2.0 | 5.0 | 10.0 | 20.0 | |
| Lignin carbon-1 | 190 | 167 | 143 | 116 | 98 | 51.6 |
| Lignin carbon-2 | 175 | 158 | 136 | 105 | 82 | 46.9 |
| Example 1 | 320 | 295 | 278 | 252 | 245 | 76.6 |
| Example 2 | 245 | 223 | 205 | 192 | 187 | 76.3 |
| Example 3 | 268 | 240 | 223 | 210 | 203 | 75.7 |
| Example 4 | 244 | 210 | 195 | 189 | 186 | 76.2 |
| Example 5 | 237 | 209 | 193 | 188 | 180 | 75.9 |
| Example 6 | 283 | 256 | 240 | 228 | 215 | 76.0 |

The lignin porous carbon nanosheets prepared in Example 1 had the specific capacitance of 320 F/g and 240 F/g at the current density of 1.0 A/g and 20.0 A/g, respectively, and a specific capacitance retention rate of 76.6%, having good rate performance and obvious performance advantages in lignin porous carbon materials.

Besides, the lignin porous carbon nanosheets prepared in all the examples were compared in terms of electrochemical performance with the lignin carbon-1 prepared by KOH activation and the lignin carbon-2 prepared by $ZnCl_2$ activation, showing that the specific capacitance and rate performance of the lignin carbon were significantly improved after oxalate activation, and the specific capacitance retention rate was higher than 75%. This was because the gas released during the thermal decomposition of oxalate had a peeling and activating effect on lignin, thereby preventing the condensation of lignin during the carbonization process; in addition, the produced metal oxide nanoparticles could etch the lignin carbon and support the lignin carbon sheet frame, and form the lignin porous carbon nanosheets with the reasonable and abundant pore structure, which could promote the rapid transmission and diffusion of electrolyte ions in the electrochemical process and improve electrochemical performance. However, the lignin carbon-1 prepared by KOH activation and the lignin carbon-2 prepared by $ZnCl_2$ activation have severe agglomeration and narrow pore-size distribution, which increases the diffusion resistance of electrolyte ions in the electrochemical process, resulting in a serious decrease in specific capacitance and rate performance.

FIG. 1 shows a scanning electron micrograph of the lignin porous carbon nanosheets prepared in Example 1 of the present invention. It can be seen from the figure that the prepared lignin carbon was a relatively regular two-dimensional carbon nanosheet with a loose structure and many pores of different sizes on the sheet.

Figure 2:
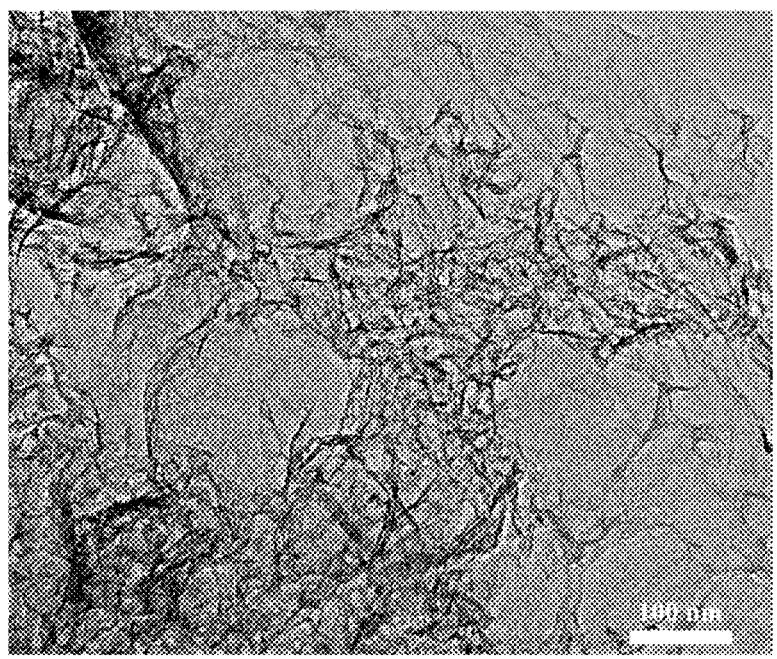
FIG. 2 shows a transmission electron micrograph of the lignin porous carbon nanosheets prepared in Example 1 of the present invention.

FIG. 2 shows a transmission electron micrograph of the lignin porous carbon nanosheets prepared in Example 1 of the present invention. It can be seen from the figure that the lignin porous carbon nanosheets had graphene-like fold lines and very abundant pore structure.

Figure 3:
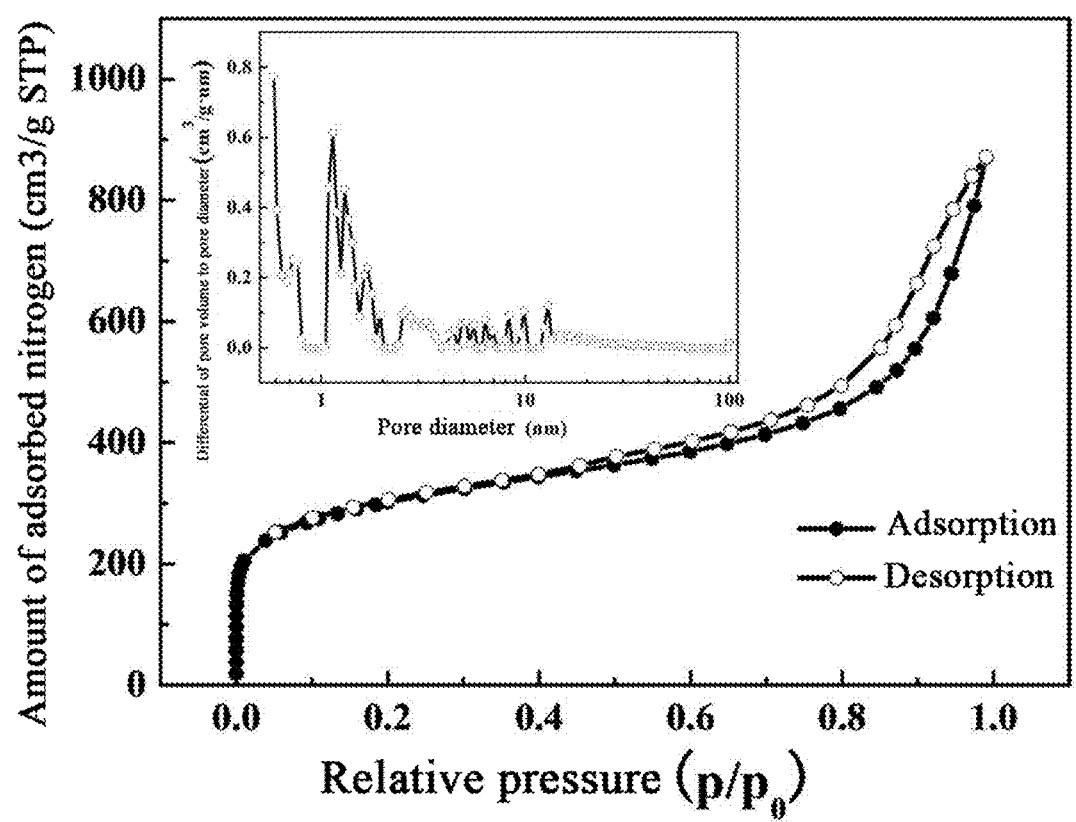
FIG. 3 shows nitrogen adsorption and desorption curves and a pore diameter distribution diagram of the lignin porous carbon nanosheets prepared in Example 1 of the present invention.

FIG. 3 shows nitrogen adsorption and desorption curves and a pore diameter distribution diagram of the lignin porous carbon nanosheets prepared in Example 1 of the present invention. It can be seen from the figure that the adsorption and desorption curves of the lignin porous carbon nanosheets belonged to type IV and had a H3 type hysteresis loop; the amount of adsorbed nitrogen increased rapidly in the region with low relative pressure, indicating that the lignin porous carbon nanosheets had a microporous structure; however, the hysteresis loop appeared in the region with high relative pressure, indicating that the lignin porous carbon nanosheets had a mesoporous structure. The total BET specific surface area of the lignin porous carbon nanosheets was 1069 $m^2/g$, wherein the microporous specific surface area was 406 $m^2/g$, the mesoporous specific surface area was 663 $m^2/g$, and the total pore volume was 1.4 $cm^3/g$. The pore diameter distribution was concentrated at 0.5-2 nm micropores and 2-30 nm mesopores. The reasonable pore structure and abundant pore diameter distribution are conducive to the improvement of electrochemical performance.

Figure 4:
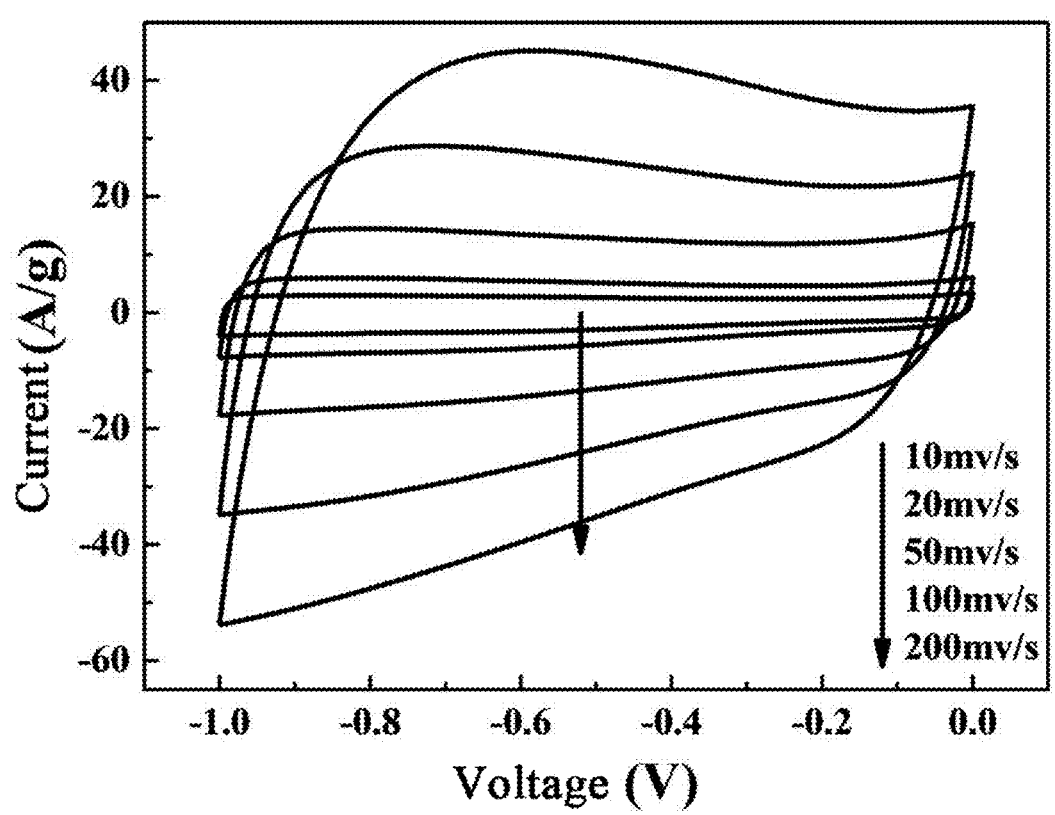
FIG. 4 shows a cyclic voltammetry curve of the lignin porous carbon nanosheets prepared in Example 1 of the present invention.

FIG. 4 shows a cyclic voltammetry curve of the lignin porous carbon nanosheets prepared in Example 1 of the present invention. It can be seen from the figure that the cyclic voltammetry curves of the lignin porous carbon nanosheets at different scanning speeds were similar to rectangles, indicating that the lignin porous carbon nanosheets had ideal electric double-layer capacitance characteristics; and there was no obvious deformation of the curves at the high scanning speed of 200 mV/s, indicating that the lignin porous carbon nanosheets had good rate performance.

Figure 5:
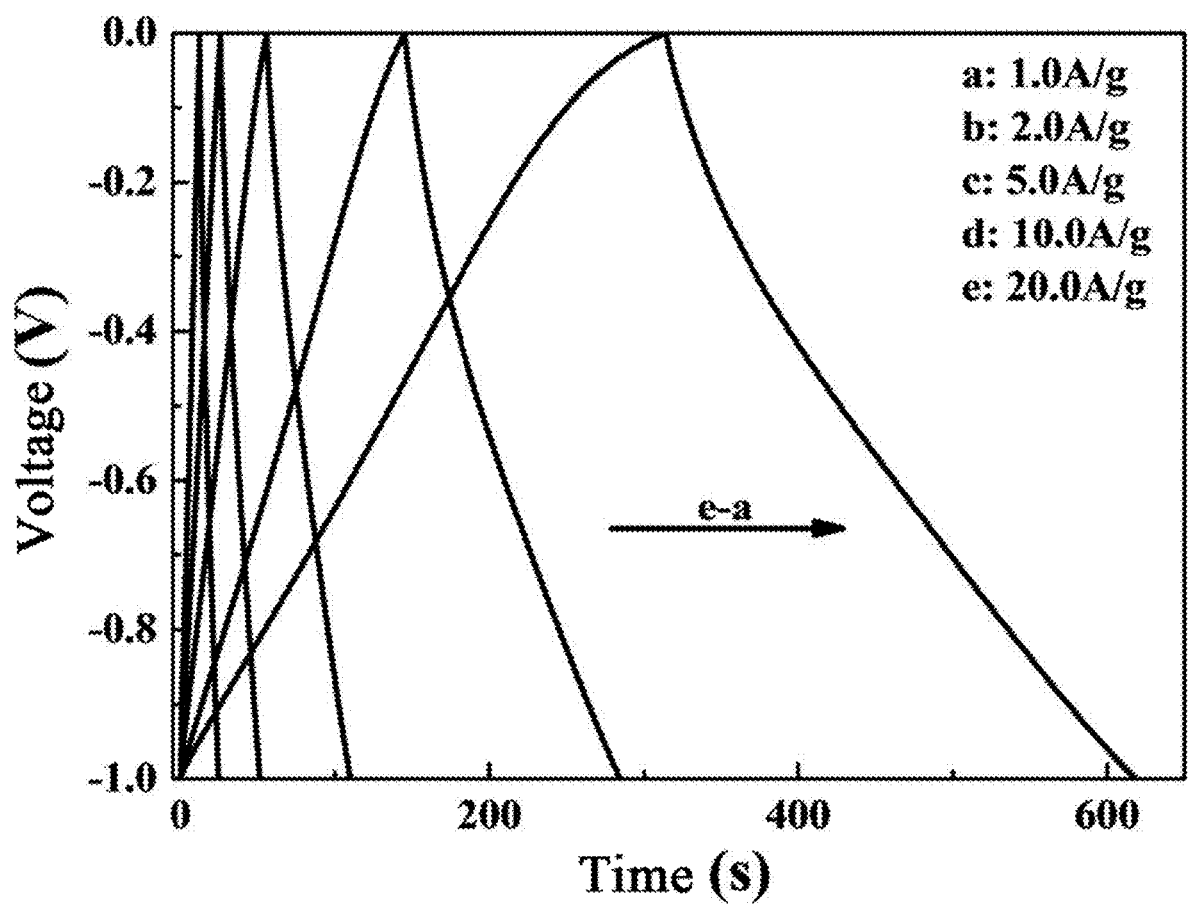
FIG. 5 shows constant DC charge and discharge curves of the lignin porous carbon nanosheets prepared in Example 1 of the present invention.

FIG. 5 shows constant DC charge and discharge curves of the lignin porous carbon nanosheets prepared in Example 1 of the present invention. It can be seen from the figure that the charge and discharge curves of the lignin porous carbon nanosheets at different current densities were similar to isosceles triangles, indicating that the lignin porous carbon nanosheets had typical electric double-layer capacitance characteristics; and the charging time and discharging time in the curves were approximately equal, indicating that the lignin porous carbon nanosheets had higher coulombic efficiency.

The above examples are preferred embodiments of the present invention, but the embodiments of the present invention are not limited thereto, and any other alterations, modifications, replacements, combinations and simplifications made without departing from the spirit and principle of the present invention should all be equivalent substitutions and included in the scope of protection of the present invention.

The invention claimed is:

1. A method for preparing lignin porous carbon nanosheets, comprising:
   (a) performing "layer-by-layer self-assembly" by (1) dispersing the sulfonated lignin and oxalate in water to form a matrix solution, wherein the sulfonated lignin is at least one of the following substances: sodium lignosulfonate, calcium lignosulfonate and magnesium lignosulfonate in an acid pulping red liquor; sulfonated products of alkali lignin in an alkali pulping black liquor; sulfonated products of enzymolytic lignin in the biorefinery industry, or mixtures thereof, the oxalate is at least one of zinc oxalate, calcium oxalate, magnesium oxalate, ferrous oxalate, cobalt oxalate, or mixtures thereof, the weight ratio of the sulfonated lignin to the oxalate is 100:(50-150), and the total mass concentration of the sulfonated lignin and oxalate in the matrix solution is 2% to 10%; (2) adding ethanol to a portion of the matrix solution and separating the precipitate to obtain a lignin/oxalate composite; (3) adding the lignin/oxalate composite to another portion of the matrix solution, then adding ethanol to obtain an assembled lignin/oxalate composite; (4) repeating step (3) multiple times to obtain a layer-by-layer self-assembled lignin/oxalate composite;
  (b) carbonizing the layer-by-layer self-assembled lignin/oxalate composite; and
  (c) pickling the carbonized layer-by-layer self-assembled lignin/oxalate composite to form the lignin porous carbon nanosheets.

2. The method for preparing lignin porous carbon nanosheets according to claim 1, wherein being "assembled" means the lignin/oxalate composite is added to the matrix solution and stirred uniformly, and then ethanol is added thereto for precipitation and separation to obtain the assembled lignin/oxalate composite;
  being assembled "multiple times" means repeating the above assembly steps many times; specifically, the assembled lignin/oxalate composite is added to the matrix solution and stirred uniformly, and then ethanol is added thereto for precipitation and separation to obtain the lignin/oxalate composite after the secondary assembly, with the process repeated 6-10 times.

3. The method for preparing lignin porous carbon nanosheets according to claim 1, wherein "carbonizing" means carbonizing at 550° C. to 850° C. for 2-4 h to obtain the lignin porous carbon nanosheets;
  "pickling" means that the carbonized product is washed in an acid solution of 0.5-2 mol/L for 1-3 h, and then washed with water, filtered and dried.

4. The method for preparing lignin porous carbon nanosheets according to claim 1, wherein the method comprises the following specific steps:
  (1) dispersing sulfonated lignin and oxalate in water to obtain a matrix solution;
  (2) taking A volume fraction of the matrix solution, adding B volume fraction of ethanol thereto while stirring, and separating the precipitate after standing to obtain a lignin/oxalate composite;
  (3) likewise taking A volume fraction of the matrix solution, adding the lignin/oxalate composite obtained in step (2) thereto and stirring uniformly, then likewise adding B volume fraction of ethanol, and separating the precipitate after standing to obtain the assembled lignin/oxalate composite;
  (4) repeating step (3) several times to obtain the layer-by-layer self-assembled lignin/oxalate composite; and
  (5) placing the layer-by-layer self-assembled lignin/oxalate composite in an inert atmosphere, carbonizing it at 550° C. to 850° C. for 2-4 h, and then pickling it to obtain the lignin porous carbon nanosheets.

\* \* \* \* \*